US012291914B2

(12) United States Patent
Herreman et al.

(10) Patent No.: US 12,291,914 B2
(45) Date of Patent: May 6, 2025

(54) RECESSED PIVOT HINGE

(71) Applicant: ARLU NV, Ardooie (BE)

(72) Inventors: Lander Jean-Pierre Herreman, Kortrijk (BE); Alexander Pauwels, Kortrijk (BE); Jean-Michel Philippe Jean-Paul Buess, Bruges (BE)

(73) Assignee: ARLU NV, Ardooie (BE)

( * ) Notice: Subject to any disclaimer, the term of this patent is extended or adjusted under 35 U.S.C. 154(b) by 139 days.

(21) Appl. No.: 18/247,886

(22) PCT Filed: Oct. 26, 2021

(86) PCT No.: PCT/IB2021/059854
§ 371 (c)(1),
(2) Date: Apr. 5, 2023

(87) PCT Pub. No.: WO2022/090908
PCT Pub. Date: May 5, 2022

(65) Prior Publication Data

US 2023/0374834 A1 Nov. 23, 2023

(30) Foreign Application Priority Data

Oct. 27, 2020 (BE) .................................. 2020/5759

(51) Int. Cl.
*E05D 7/08* (2006.01)
*E05D 7/04* (2006.01)
(Continued)

(52) U.S. Cl.
CPC ........... *E05D 7/0415* (2013.01); *E05D 7/081* (2013.01); *E05D 7/1005* (2013.01);
(Continued)

(58) Field of Classification Search
CPC ........... E05D 7/104; E05D 7/081; E05D 7/10; E05D 7/1005; E05D 7/1011;
(Continued)

(56) References Cited

U.S. PATENT DOCUMENTS 2,933,756 A * 4/1960 Muessel ................ E05D 7/1005 16/229
4,434,524 A * 3/1984 Gilchrist ................. E05F 15/60 16/280
(Continued)

FOREIGN PATENT DOCUMENTS

CN 207988766 U * 10/2018 ............... E05D 3/02
CN 209670646 U * 11/2019
(Continued)

OTHER PUBLICATIONS

International Search Report and Written Opinion for International Application No. PCT/IB2021/059854, mailed on Feb. 24, 2022.

*Primary Examiner* — Chuck Y Mah
(74) *Attorney, Agent, or Firm* — FRESH IP PLC; Terrence Brown

(57) ABSTRACT

The present disclosure relates to a recessed pivot hinge for hingeably fastening a door leaf in a door frame, including
a pivot;
a fitting sleeve in which the pivot is fitted in a height-adjustable manner;
a socket which is fastenable in a recessed manner in the door frame or forms part thereof; and
a fastening body, to be recessed into the door leaf, for fastening in the door leaf;
wherein provision is made for an end of the pivot to be drawn into the socket using magnetic elements of the pivot and the socket;
and where the fitting sleeve is fastened in the fastening body so as to be adjustably displaceable in a first
(Continued)

direction (X), transverse to the height direction (Z), and in a second direction (Y), transverse to the first direction (X) and transverse to the height direction (Z).

15 Claims, 4 Drawing Sheets

(51) Int. Cl.
*E05D 7/081* (2006.01)
*E05D 7/10* (2006.01)

(52) U.S. Cl.
CPC ... *E05D 2007/0484* (2013.01); *E05Y 2201/46* (2013.01); *E05Y 2900/132* (2013.01)

(58) Field of Classification Search
CPC ... E05D 7/1022; E05D 7/1027; E05D 7/1033; E05D 7/1038; E05D 7/1061; E05D 7/0415; E05D 7/0423; E05D 3/02; E05D 2007/0469; E05D 2007/0484; E05D 2007/0492; E06B 7/28; E05Y 2007/1038; E05Y 2201/46; E05Y 2201/418; E05Y 2900/132; E05Y 16/242; E05Y 16/239; E05Y 16/246; E05Y 16/262; E05Y 16/263; E05Y 16/229
See application file for complete search history.

(56) References Cited

U.S. PATENT DOCUMENTS

| | | | | | |
|---|---|---|---|---|---|
| 5,483,770 | A * | 1/1996 | Marinoni | E05D 7/0423 | 16/229 |
| 5,490,305 | A * | 2/1996 | Domingo Ribot | E05D 7/081 | 16/229 |
| 6,609,335 | B1 * | 8/2003 | Hyakkoku | E05F 5/02 | 16/229 |
| 8,356,387 | B1 * | 1/2013 | Mattix | E05D 15/266 | 16/382 |
| 8,522,400 | B1 * | 9/2013 | Jablonski | E05D 11/1007 | 16/326 |
| 8,650,712 | B2 * | 2/2014 | Wach | E05F 1/123 | 16/236 |
| 11,686,136 | B2 * | 6/2023 | Ridley | E05D 7/081 | 49/141 |
| 2013/0081331 | A1 * | 4/2013 | Vullings | E05D 7/1011 | 16/231 |
| 2013/0111818 | A1 * | 5/2013 | Yagi | E05D 7/1011 | 49/465 |
| 2020/0056411 | A1 * | 2/2020 | Dries | E05F 5/02 | |

FOREIGN PATENT DOCUMENTS

| | | | | |
|---|---|---|---|---|
| DE | 102008028756 B3 * | 7/2009 | E05D 7/04 |
| EP | 2 208 843 A2 | 7/2010 | |
| EP | 2 297 418 B1 | 2/2012 | |
| JP | 2002 021411 A | 1/2002 | |
| JP | 2014198932 A * | 10/2014 | |

* cited by examiner

RECESSED PIVOT HINGE

This application is a National Phase entry of International Application No. PCT/IB2021/059854 under § 371 and claims the benefit of Belgian Patent Application No. BE2020/5759, filed Oct. 27, 2020, which is hereby incorporated by reference in its entirety.

FIELD OF THE INVENTION

The present disclosure relates to a recessed pivot hinge for hingeably fastening a door leaf in a door frame, comprising

- a pivot having a first end and a second end;
- a fitting sleeve in which at least the first end of the pivot is fitted in a height-adjustable manner, wherein this fitting sleeve is fastenable in a rotationally fixed manner in the door leaf in order to fasten the pivot in the door leaf; and
- a socket which is fastenable in a recessed manner in the door frame or forms part thereof.

A pivot hinge is a hinge which, on the one hand, comprises a pivot in a fitting sleeve which is accommodated either in the door leaf or in the door frame, and which, on the other hand, comprises a socket (bushing), which is respectively accommodated either in the door frame or in the door leaf. The pivot can be rotatably accommodated in the socket. A door leaf can be hingeably fastened in a door frame with the aid of a pivot hinge above the door and a pivot hinge below a door.

A pivot hinge according to the disclosure is arranged above a door. In this case, the fitting sleeve thereof is accommodated in the door leaf and the socket thereof is provided in the door frame. In principle, it is not necessary to provide a separate element as a socket. It is sufficient for a hole to be drilled in the door frame.

A door is understood to mean the combination of door leaf, door frame (boundary of the door opening) and door opening. The doors in which a hinge according to the disclosure is incorporated are also referred to as swing doors or pivot doors. These may be conventional doors, but may for example also be folding blinds, folding screens, etc. Door frame is understood to mean the complete boundary of the door opening. The floor therefore also forms part of the door frame where it delimits the door opening. In the case of room-high doors (doors which touch the ceiling), the ceiling may also form part of the door frame where it delimits the door opening.

BACKGROUND

Existing pivot hinges often have a pivot which is fixedly fastened to the door leaf or the door frame. However, the fastening of a door leaf in a door frame, in other words the fitting of the pivot in the socket, is very cumbersome in the case of pivot hinges of this kind.

To solve this problem, there are various pivot hinges in which, like in the case of a pivot hinge to which the present disclosure relates, a fitting sleeve is fastened in the door leaf or the door frame and in which a pivot is displaceable in terms of height with respect to the fitting sleeve. When the door leaf is mounted in the door frame with the aid of such a pivot hinge, a first end of the pivot extends into the fitting sleeve and its second end extends into the socket. Known examples of recessed embodiments of such pivot hinges are described and shown in BE 1 020 498 A5, for example.

JP 2002-21411 A and KR 20-2018-0000324 U describe non-recessed pivot hinges in which a fitter can use both hands to manipulate the door leaf with the aid of magnetic elements in the pivot and the socket without having to activate or hold the pivot. If the door leaf has not yet been fitted in the door frame, the first end of the pivot will rest in the fitting sleeve under the influence of gravity. In this case, the second end may possibly also be located in the fitting sleeve, or protrude slightly with respect to this fitting sleeve. If the door leaf has been fitted in the door frame, with the pivot under the socket, the pivot is automatically drawn into the socket under the influence of the magnetic force between the magnetic elements in order to fit said pivot into the socket. The first end of the pivot will then still be located in the fitting sleeve, but now less far. Now, the second end of the pivot has been drawn into the socket. The door leaf is thus fastened in the door frame.

One problem with existing pivot hinges is that they have to be positioned very precisely. Over time, however, parts of a house often move in relation to one another as a result of expansion and/or shrinkage and/or wear, as a result of which the swing door may begin to drag or stick. Applying the solution from JP 2002-21411 A and KR 20-2018-0000324 U in the case of recessed pivot hinges does not offer a solution to this.

EP 2 208 843 A2 suggests moving away from recessed embodiments with regard to adjustable hinges.

SUMMARY

It is the object of the present disclosure to provide a solution whereby this problem can be solved in a simple manner in the case of recessed pivot hinges, without major work.

This object of the disclosure is achieved by providing a recessed pivot hinge for hingeably fastening a door leaf in a door frame, comprising

- a pivot having a first end and a second end;
- a fitting sleeve in which at least the first end of the pivot is fitted in a height-adjustable manner, wherein this fitting sleeve is fastenable in a rotationally fixed manner in the door leaf in order to fasten the pivot in the door leaf;
- a socket which is fastenable in a recessed manner in the door frame or forms part thereof; and
- a fastening body, to be recessed into the door leaf, for fastening the fitting sleeve in the door leaf;

wherein the pivot is provided with one or more magnetic elements, and wherein the socket is provided with one or more magnetic elements, in order to draw the second end of the pivot into the socket using the magnetic elements of the pivot and the socket, and wherein the fitting sleeve is fastened in the fastening body so as to be adjustably displaceable in a first direction transverse to the height direction and is fastened in the fastening body so as to be adjustably displaceable in a second direction transverse to the first direction and transverse to the height direction.

Since the fitting sleeve is now adjustably displaceable in the fastening body in the first direction and in the second direction, less accuracy is required during the positioning itself and it is thus possible to save time. The pivot can be inserted into the socket much more quickly, following which the position can be adjusted more accurately.

Since the fitting sleeve is adjustably displaceable in the fastening body in the first direction and in the second direction, it is in addition possible to eliminate clearances resulting from parts of a house moving in relation to one another as a result of expansion and/or shrinkage and/or wear. The position of the fitting sleeve in the fastening body may be readjusted such that the pivot is once again nicely aligned with respect to the socket in order to prevent dragging or sticking of the door.

To this end, the fitting sleeve may be fastened in the fastening body in such a way that it is adjustably displaceable on the one hand in the first direction and on the other hand in the second direction by means of discrete linear movements. However, the readjustment in the first direction and in the second direction does not necessarily have to be brought about by means of discrete linear movements in each of these directions, but may alternatively also be brought about by means of all kinds of movements which comprise subcomponents in both directions. The fitting sleeve may thus be fastened in the fastening body so as to be adjustable, for example by means of a hinged or rotational movement. In another alternative, the fitting sleeve may be adjustably displaceable by means of discrete movements in a third direction and in a fourth direction which are not transverse to one another and differ from said first direction and said second direction.

In a specific embodiment, a pivot hinge according to the present disclosure comprises a pivot holder which is mounted in the fastening body in an adjustably displaceable manner and the fitting sleeve is mounted in this pivot holder in an adjustably displaceable manner in order to mount this fitting sleeve in the fastening body so as to be adjustably displaceable in the first direction and in the second direction.

Preferably, in this case the pivot holder is then mounted in the fastening body so as to be adjustably displaceable in the first direction and the fitting sleeve is mounted in the pivot holder so as to be adjustably displaceable in the second direction.

Even more preferably, in this case the pivot holder is then mounted in the fastening body so as to be linearly displaceable in this first direction and the fitting sleeve is mounted in the pivot holder so as to be linearly displaceable in the second direction. By effecting the displacement movements linearly in these two directions, it is possible to move the parts of the pivot hinge in relation to one another in a more intuitive manner in order to eliminate clearances that may occur.

A pivot hinge according to the present disclosure is furthermore preferably provided with actuating means (actuators) which are provided in order for a hand tool to engage therewith for the adjustable displacement of the fitting sleeve in the fastening body. To this end, these actuating means are provided with actuating heads in order for this hand tool to engage therewith. These actuating heads are preferably accessible via the top of the door leaf, and preferably from both sides of this door leaf. In this case, there is preferably a clearance of between 4 and 8 mm between the door leaf and the door frame when a door leaf is being fastened in a door frame.

Such actuating means preferably comprise first actuating means which are configured to displace the fitting sleeve in the first direction and which comprise at least one first actuating head of said actuating heads. Here, this first actuating head preferably protrudes at least partially beyond an upper surface of the fastening body so that the hand tool can engage therewith in a simple manner. Even more preferably, the actuating means are provided in such a way that an upper surface of this first actuating head forms an upper surface of the first actuating means and always remains positioned at the same height above the upper surface of the fastening body.

Furthermore, said actuating means preferably comprise second actuating means which are configured to displace the fitting sleeve in the second direction and which comprise at least one second actuating head of said actuating heads. Here, this second actuating head preferably protrudes at least partially beyond an upper surface of the fastening body so that the hand tool can engage therewith in a simple manner. Even more preferably, the actuating means are provided in such a way that an upper surface of this second actuating head forms an upper surface of the second actuating means and always remains positioned at the same height above the upper surface of the fastening body.

Since each of the upper surfaces of the actuating heads always remains positioned at the same height above the upper surface of the fastening body, it is possible to minimize clearance between a door leaf that is fastened in a door frame by means of such a pivot hinge and this door frame. In this case, the rest of the actuating means may be provided so as to be displaceable inside the fastening body, in which case they may possibly also be displaceable in a height direction as long as these upper surfaces remain at the same height.

In the case of a pivot hinge according to the present disclosure having the aforementioned actuating means, the fastening body preferably comprises one or more depressions which are recessed with respect to said upper surface thereof. The actuating means are then preferably arranged partially in these one or more depressions.

A portion of these actuating means preferably extends outside the one or more depressions so that hand tools can engage therewith in a simple manner. By accommodating a portion of these actuating means in one or more such depressions, it is possible to further minimize clearance between a door leaf that is fastened in a door frame by means of such a pivot hinge and this door frame. In this case, the fastening body is preferably also fitted so as to be completely recessed in the door leaf in order to produce a recessed pivot hinge and thus further minimize the clearance.

More specifically, the actuating means may comprise fastening means (fasteners) which are displaceable in corresponding slots for the adjustable displacement of the fitting sleeve in the fastening body.

In embodiments comprising an aforementioned pivot holder, this pivot holder may thus be provided with slots and the first actuating means may be provided with first fastening means which are displaceable in the slots in the pivot holder for the adjustable displacement of the pivot holder in the fastening body, and the pivot holder may furthermore be provided with a fitting slot and the second actuating means may be provided with second fastening means which are displaceable in this fitting slot for the adjustable displacement of the fitting sleeve in the pivot holder.

By displacing such fastening elements with respect to slots in the pivot holder, it is possible to position the pivot holder in different positions with respect to the fastening body in a simple manner and it is possible to position the fitting sleeve in different positions with respect to the pivot holder in a simple manner in order to thus position the fitting sleeve in different positions with respect to the fastening body in a simple manner.

Said fastening elements may be implemented, for example, as bolts and nuts. These nuts and/or these bolts may be produced for example in the form of guide blocks, which are fitted with guiding action in a corresponding fitting space, for guiding the displacement movement of the fitting sleeve with respect to the fastening body.

One or more surfaces of parts of the pivot hinge, such as for example the fastening body and the pivot holder, said surfaces being clamped against one another with the aid of such fastening elements when the position of the fitting sleeve in the fastening body is being adjusted, are preferably provided with a structural relief in order to prevent these parts from moving undesirably in relation to one another after the position of the fitting sleeve in the fastening body has been adjusted.

Such a structural relief may be provided for example in the form of grooves in such a surface.

If said guide blocks are provided, a surface of these guide blocks that is clamped against another part of the pivot hinge, such as for example the pivot holder, when the fitting sleeve is being adjusted is preferably also provided with such a structural relief.

Instead of providing the pivot holder with said slots, it is conversely also possible, for example, to provide the fastening body with slots in which fastening means for fastening the pivot holder in the fastening body are fitted displaceably as actuating means for the adjustable displacement of the pivot holder in the fastening body.

Alternatively, the pivot holder may for example be provided as an eccentric piece that is fastened so as to be eccentrically displaceable in the fastening body.

Said second actuating means furthermore preferably comprise an adjusting sleeve which is provided with an internal screw thread and which serves as an aforementioned actuating head and an aforementioned nut. In this case, the fitting sleeve is then preferably provided with a corresponding external screw thread and serves as an aforementioned bolt and an aforementioned guide block. Here, the pivot holder is then preferably provided with an aforementioned fitting slot through which the fitting sleeve is fastened to the adjusting sleeve by the internal screw thread and the external screw thread engaging with each other, such that the fitting sleeve and the adjusting sleeve are adjustably displaceable with respect to the fitting slot in the pivot holder.

In this case, the fitting sleeve and the adjusting sleeve preferably engage over edges of the fitting slot.

Furthermore, in this case the pivot holder is then preferably provided with an aforementioned fitting space in which the fitting sleeve is fitted with guiding action as a guide block for guiding the displacement movement of the fitting sleeve and the adjusting sleeve with respect to the fitting slot and thus also with respect to the pivot holder.

Here, the fitting space may then be provided, for example, with an internal collar forming an aforementioned edge with which the fitting sleeve engages when the fitting sleeve is being fastened in the pivot holder with the aid of the adjusting sleeve.

One or more surfaces of the pivot holder, the fitting sleeve and the adjusting sleeve, said surfaces being clamped against one another when the fitting sleeve is being fastened in the pivot holder with the aid of the adjusting sleeve, are preferably provided with a structural relief in order to prevent undesired displacement of the fitting sleeve and the adjusting sleeve with respect to the pivot holder.

In order to make the pivot hinge adjustable in a simple manner from both sides of a door leaf, said actuating heads are preferably arranged centrally between the two longitudinal sides of the fastening body of a pivot hinge according to the present disclosure, wherein a first longitudinal side is configured to be arranged on a first side of the door leaf and a second longitudinal side is configured to be arranged on a second side of the door leaf.

The pivot of a pivot hinge according to the disclosure is preferably provided with a permanent magnet as the aforementioned magnetic element and the socket is also preferably provided with a permanent magnet as the aforementioned magnetic element.

Preferably, in this case the pivot is provided with a single permanent magnet and the socket is also provided with a single permanent magnet in order to simplify assembly of the pivot on the one hand and the socket on the other hand, since no counteracting magnetic forces between parts of this pivot or parts of this socket will occur during the assembly thereof.

Instead of providing both the pivot and the socket with a permanent magnet, it is alternatively also possible, for example, to provide one of the two with a permanent magnet and the other of the two with an element made of ferromagnetic material. In this case, this other of the two (the socket or the pivot) may possibly also be manufactured completely from such ferromagnetic material.

A pivot hinge according to the present disclosure furthermore preferably also comprises fixing means (fixers) for fixing the pivot with respect to the fitting sleeve when the second end of the pivot has been drawn into the socket.

The magnetic coupling between the magnetic elements of the pivot and the socket is sufficient to drive the second end of the pivot into the socket. With the aid of such fixing means, it is possible to ensure that the pivot is then held firmly in this position, even if circumstances were to result in the magnetic coupling being severed. In this way, the pivot is prevented from being able to come loose in an undesired manner.

BRIEF DESCRIPTION OF THE DRAWINGS

The present invention will now be explained in greater detail by means of the following detailed description of embodiments of pivot hinges according to the present invention. The sole aim of this description is to give illustrative examples and to indicate further advantages and features of these pivot hinges and therefore cannot be interpreted as limiting the scope of application of the invention or of the patent rights defined in the claims.

In this description, reference numerals are used to refer to the attached drawings, in which.

DETAILED DESCRIPTION

Figure 1:
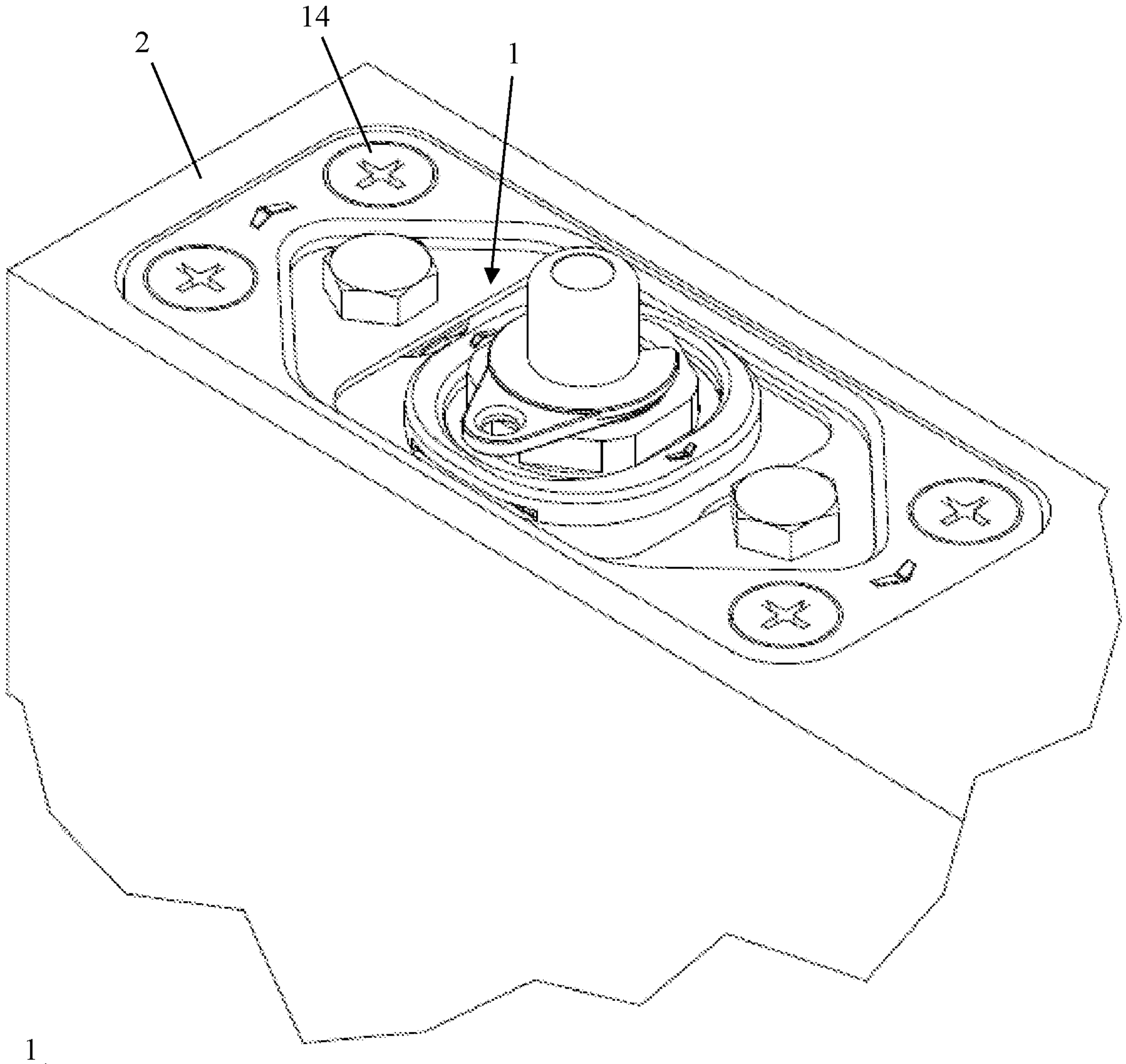
FIG. 1 shows a corner of a door leaf in which a part of a pivot hinge according to at least one embodiment of the present disclosure is fastened.
Figure 2:
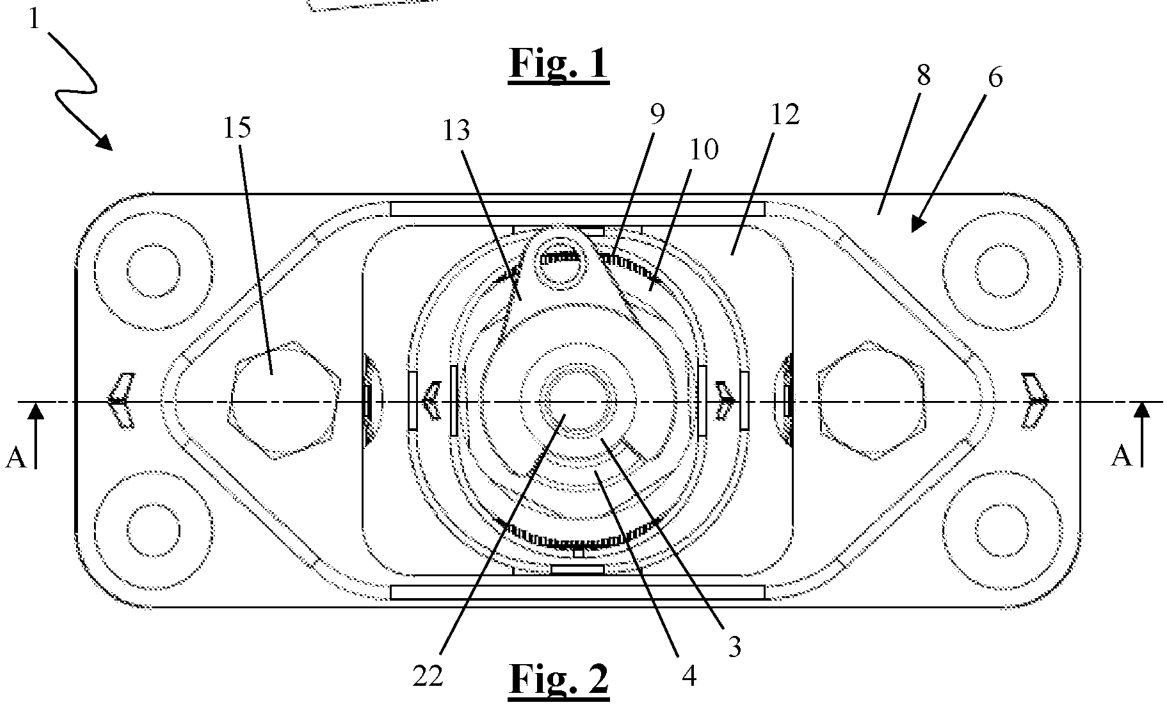
FIG. 2 shows a top view of the part of the pivot hinge from FIG. 1.
Figure 3:
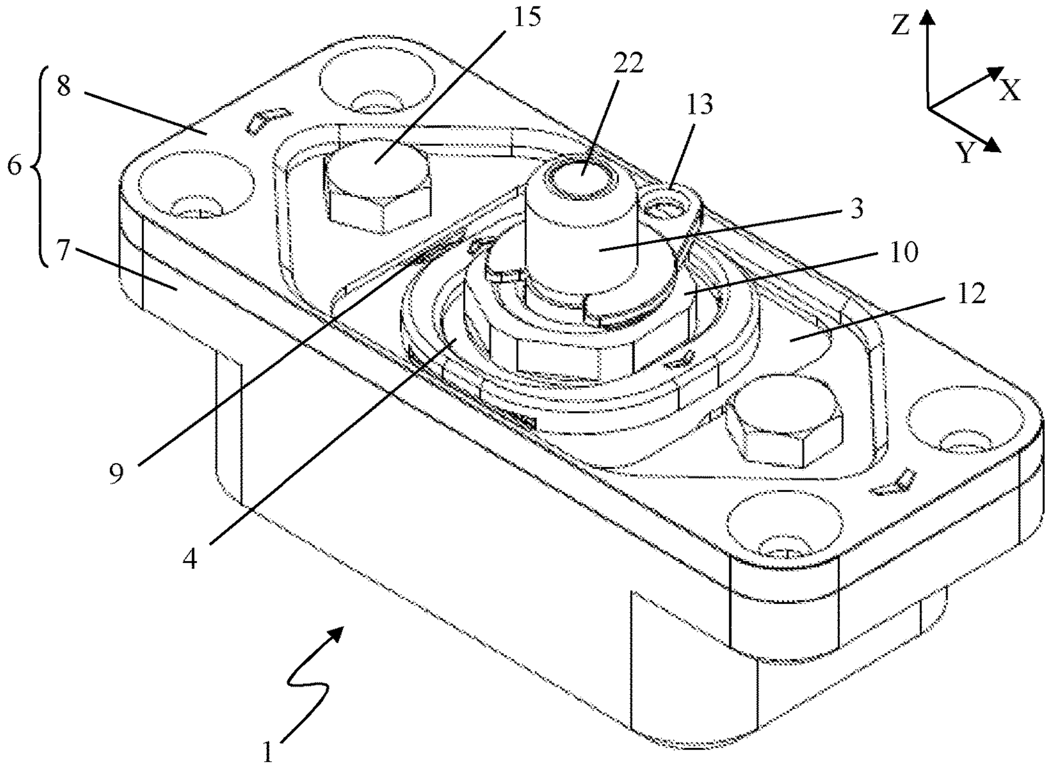
FIG. 3 shows a perspective view of the part of the pivot hinge from FIG. 1.
Figure 4:
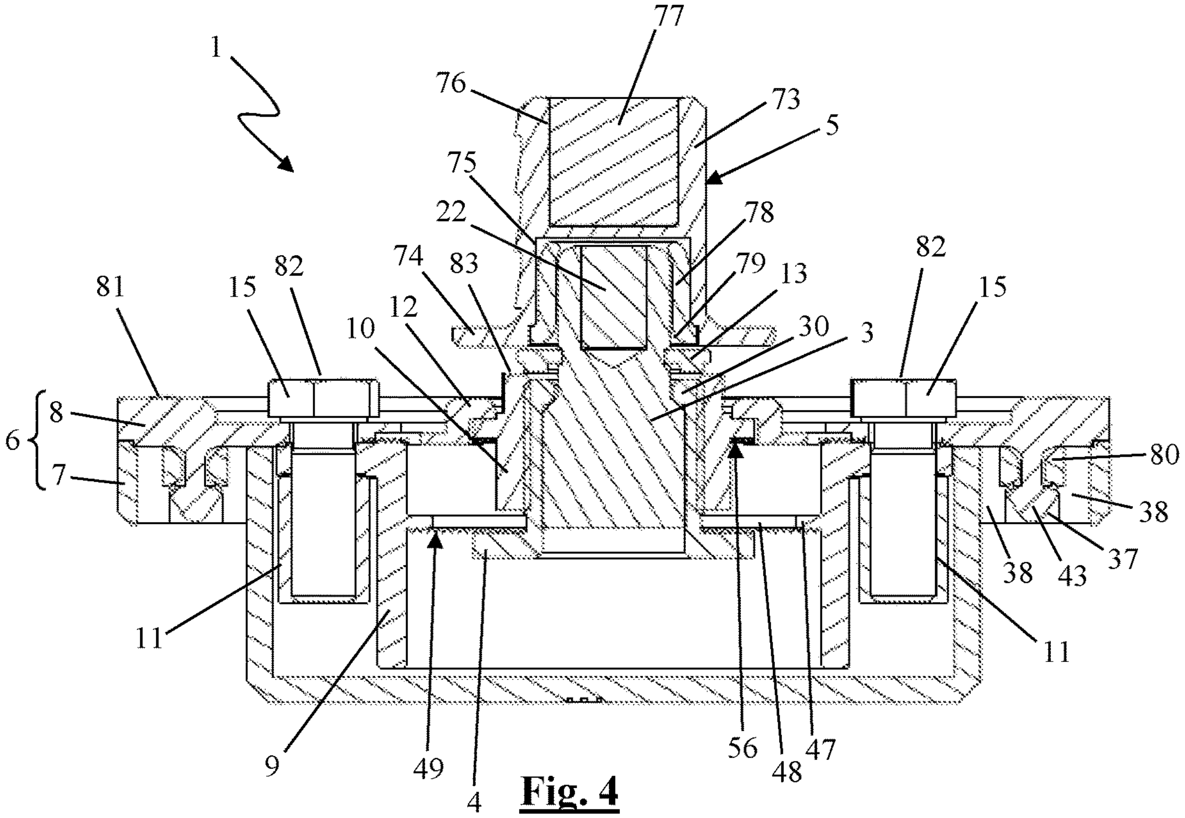
FIG. 4 shows the pivot hinge according to at least one embodiment of the present disclosure, a part of which is shown in FIG. 1, completely in cross section, sectioned along the axis AA in FIG. 2.

The pivot hinges (1) shown in the figures comprise on the one hand a pivot (3), a first end (23) of which is fitted in a height-adjustable manner in a fitting sleeve (4) which is fitted in a door leaf (2), and on the other hand a socket (5) which is fastenable in a door frame (not shown).

In the pivot (3), a fitting space (21) is provided at a second end (24) and has a permanent magnet (22) fitted in it.

In the socket (5), a second fitting sleeve (78) is provided on a first side in a first fitting space (75) and the second end (24) of the pivot (3) is fittable in said second fitting sleeve. In the socket (5), on a second side situated opposite the first side, a permanent magnet (77) is fitted in a second fitting space (76).

When the pivot (3) is brought under the fitting sleeve (78) of the socket (5), the second end (24) of the pivot (3) will be driven into this fitting sleeve (78) under the influence of the attractive force between the permanent magnets (22, 77) of the pivot (3) and the socket (5). In order for the pivot (3) to be accommodated smoothly into the fitting sleeve (78) of the socket (5), the inlet side of this fitting sleeve (78) is provided with a guiding bevel (79) and the second end (24) of the pivot (3) is also provided with a bevelled edge (20).

In order to fasten the socket (5) in the door frame, said socket is provided with a cylindrical housing (73) with fastening flanges (74) which protrude with respect to this housing (73). A space which corresponds thereto may be provided in the door frame in a known manner, for example by milling, such that the socket (5) may be fastened in the door frame in a recessed manner.

It was stated in the introductory part that, in a simple alternative embodiment, it is fundamentally not necessary to provide a separate element as socket, but that a hole may possibly be drilled into the door frame to serve as a socket. In such an embodiment, this hole may be provided with such a permanent magnet at the top.

In the embodiments shown, a permanent magnet (22, 77) is provided both in the pivot (3) and in the socket (5). Alternatively, it is for example also possible to provide a permanent magnet in one of the two and to manufacture the other of the two at least partially from ferromagnetic material.

In order to fit the pivot (3) with the first-mentioned fitting sleeve (4) in the door leaf (2), the pivot hinge (1) is provided with a fastening body (6) in the embodiments shown.

A space which corresponds to this fastening body (6) is provided in the door leaf (2) so that this fastening body (6) may be fitted in this door leaf (2) in a recessed manner, as is the case in FIG. 1. In a wooden door leaf (2) or blind or screen, this space may be milled out for this purpose. In known manners, it would analogously also be possible for a pivot hinge (1) according to the disclosure to be developed with an adapted fastening body for fastening in a glass door leaf, in which case provision is then analogously made for a cutout to be provided in the glass door leaf for this purpose.

Figure 5:
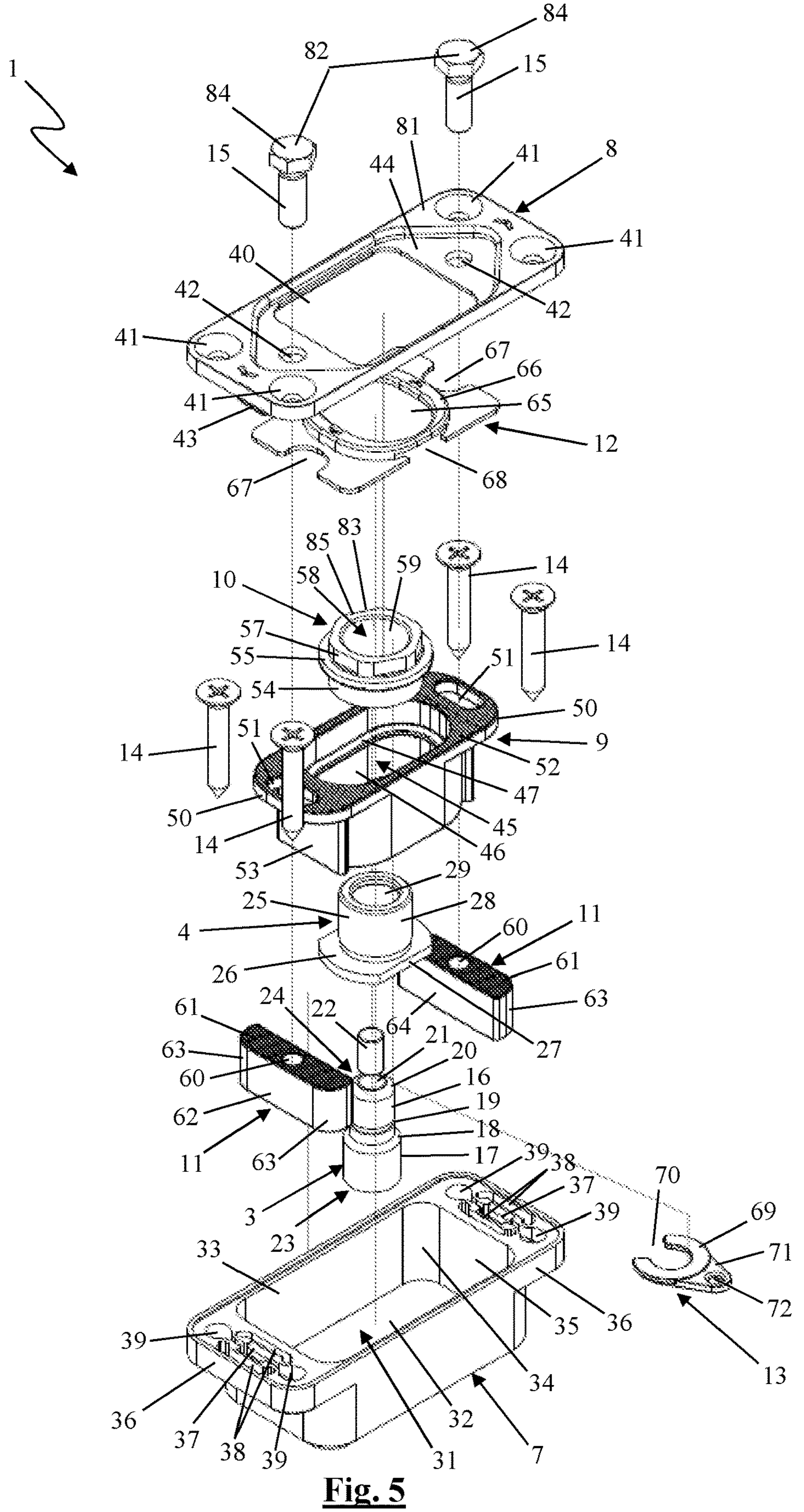
FIG. 5 shows a cut-away perspective view of the part of the pivot hinge from FIG. 1.

In the embodiments shown, the fastening body (6) comprises a fastening base (7) and a fastening plate (8). The fastening base (7) and the fastening plate (8) may be manufactured, for example, from plastic, for example by injection moulding. In the embodiments shown, the fastening base (7) is provided with protruding flanges (36) in which cutouts (37, 38) are made to form a click-fit slot (37), the edges (80) of which are elastically displaceable in order for click-fit legs (43) of the fastening plate (8) to be click-fitted in place therein. With the aid of the click-fit legs (43) and the click-fit slots (37), the fastening plate (8) may be attached to the fastening base (7) before the fastening body (6) is accommodated in the door leaf (2). Once the fastening body (6) is accommodated in the door leaf (2), it may be fixed in the latter with the aid of screws (14), which are fitted through threaded holes (41) in the fastening plate (8) and corresponding threaded holes (39) in the flanges (36) of the fastening base (7), as can be seen in FIGS. 1 and 5.

The fastening base (7) is furthermore provided with a fitting space (31) in which further parts of the pivot hinge (1) may be accommodated for fastening the fitting sleeve (4) in the fastening body (6). The fastening plate (8) is provided with a passage opening (40) through which the fitting sleeve (4) partially extends after it has been fastened in the fastening body (6).

In the embodiments shown, the bottom of the fastening base (7) is terminated by a bottom (32). In alternative embodiments, this bottom (32) may possibly also be omitted.

Mounted in the fitting space (31) is a pivot holder (9) which is adjustably displaceable in this fitting space (31) in a first direction (X). The fitting sleeve (4) is in turn mounted in the pivot holder (9) so as to be adjustably displaceable in a second direction (Y).

In order to accommodate the pivot holder (9) in the fitting space (31) of the fastening base (7) of the fastening body (6) so as to be adjustably displaceable in the first direction (X), the pivot holder (9) is provided with flanges (50) in which slots (51) are provided and extend mainly in this first direction (X). Bolts (15) are fitted through corresponding holes (42) in the fastening plate (8), engage through these slots (51) in the pivot holder (9) and engage in corresponding threaded holes (60) in guide blocks (11) which serve as nuts in this case.

In order to turn the bolts (15), a hand tool may be used to engage with an actuating head (84) thereof. When loosening the bolts (15), the upper surface (82) thereof always remains at the same height with respect to the upper surface (81) of the fastening body (6). The guide blocks (11) move downwards, as a result of which the bolts (15) are displaceable in the slots (51) in the first direction (X). When tightening the bolts (15), the guide blocks (11) are drawn upwards again and the flanges (50) of the pivot holder (9) are thus clamped between the guide blocks (11) and the fastening plate (8). In order to prevent these parts from being able to move in relation to one another in an undesired manner afterwards in this case, on the one hand the upper surface (61) of the guide blocks (11) is provided with grooves and on the other hand the upper surface (52) of the pivot holder (9) is provided with grooves.

The guide blocks (11) are fitted with guiding action between external guide surfaces (53) of the pivot holder (9) on the one hand and short side surfaces (35) of the fitting space (31) in the fastening base (7) on the other hand. To this end, respective guide surfaces (64, 62) of the guide blocks (11) abut the guide surfaces (53, 35) of the pivot holder (9) and the fastening body (6). The displacement movement of the guide blocks (11) in the first direction (X) is limited by curved side surfaces (63) of the guide blocks (11) striking against the corresponding curved side surfaces (34) of the fitting space (31) in the fastening body (6).

In order to mount the fitting sleeve (4) in the pivot holder (9) so as to be adjustably displaceable in the second direction (Y), the pivot holder (9) is provided with a fitting space (45) in which an internal collar (47) is provided, which delimits a passage opening (48). The passage opening (48) extends substantially in the second direction (Y). The fitting sleeve (4) is provided with a cylindrical base body (25) which is configured to extend through the passage opening (48) of the pivot holder (9), and a flange (26) which protrudes with respect to this base body (25) and which is configured to engage with the bottom of the internal collar (47). The base body (25) is furthermore provided with an external screw thread (28) so that the fitting sleeve (4) may be designed as a bolt. An adjusting sleeve (10) is provided with a corresponding internal screw thread (59) and serves as a nut that corresponds to the bolt. This adjusting sleeve (10) comprises a cylindrical base body (54) which is provided with an external flange (55). The part of the cylindrical base body (54) under the external flange (55) is configured to engage in the fitting space (45) of the pivot holder (9) via the top side, with the external flange (55) being configured to engage at the top of the upper surface (52) of the pivot holder (9). In order to turn the adjusting sleeve (10), the base body (54) above the flange (55) is designed as an actuating head (85) which is provided with gripping surfaces (57) so that a hand tool can engage therewith. By fitting the fitting sleeve (4) at the bottom of the fitting space (45) of the pivot holder (9) and the adjusting sleeve (10) at the top of the fitting space (45) and allowing the external screw thread (28) of the fitting sleeve (4) to engage in the internal screw thread of the adjusting sleeve (10), it is possible to fasten the fitting sleeve (4) and the adjusting sleeve (10) in the fitting space (45) by tightening the adjusting sleeve (10). Rotation of the fitting sleeve (4) with respect to the fitting space (45) is in this case prevented, since the flange (26) of this fitting sleeve (4) is provided with locking surfaces (27) that engage with the side surfaces (46) of the fitting space (45) of the pivot holder (9). In this way, the fitting sleeve (4) is provided in the pivot holder (9) in a rotationally fixed manner. When unscrewing the adjusting sleeve (10), the upper surface (83) of this adjusting sleeve (10) remains at the same height above the upper surface (81) of the fastening body (6), while the fitting sleeve (4) moves downwards. The fitting sleeve (4) and the adjusting sleeve (10) are thus displaceable in the passage opening (48) in the second direction (Y). When tightening the adjusting sleeve (10), the fitting sleeve (4) is drawn upwards again until it clamps against the internal collar (47) of the pivot holder (9). In order to prevent the fitting sleeve (4) and the adjusting sleeve (10) from being able to move in an undesired manner after tightening, on the one hand the bottom of the internal collar (47) of the pivot holder (9) is provided with a ribbed surface (49) and on the other hand the bottom of the external flange (55) of the adjusting sleeve (10) is provided with a ribbed surface (56).

In order to further guide both the displacement movement of the pivot holder (9) in the first direction (X) and the displacement movement of the fitting sleeve (4) in the second direction (Y), the pivot hinge (1) is additionally provided with the guide plate (12) in the embodiments shown. This guide plate (12) is provided with a passage opening (65) which extends substantially in the first direction (X) and through which the adjusting sleeve (10) engages. The passage opening (65) is delimited by a stepped raised edge (66) of the guide plate (12), under which the flange (55) of the adjusting sleeve (10) engages. When the pivot holder (9) is being displaced in the fastening body (6), the pivot holder (9) entrains this adjusting sleeve (10) in its displacement movement and the adjusting sleeve (10) is displaced in guided fashion in this passage opening (65), in which case the latter also guides the displacement movement in this first direction (X). In order to be able to fully implement this displacement movement, the stepped edge (66) is provided, at the ends of the passage opening (65), with a cutout (68) for the flange (55) of the adjusting sleeve (10).

The guide plate (12) is in turn fitted with guiding action on top of the upper surface (52) of the pivot holder (9) and under the fastening plate (8), wherein this guide plate (12) is displaceable together with the adjusting sleeve (10) and the fitting sleeve (4) in the second direction (Y) and also guides the displacement movement in the second direction (Y). In order to not be obstructed by the bolts (15) in the process, cutouts (67) are provided in the corresponding edges of this guide plate (12).

In order to be able to minimize the clearance between the door leaf (2) and the door frame, the fastening plate (8) is provided with a depression (44), which is recessed with respect to the upper surface (81) of the fastening plate (8). Both the bolts (15) and the adjusting sleeve (10), with which a hand tool can engage, are arranged in this depression (44) and extend partially outside this depression (44). In this way, these bolts (15) and adjusting sleeve (10) remain easily accessible and a hand tool can engage with these bolts (15) or this adjusting sleeve (10) without a relatively large clearance being required between the door leaf (2) and the door frame for this purpose.

In order to mount the fitting sleeve (4) in the fastening body (6) in an adjustably displaceable manner, many alternatives are also possible, as already explained above in the general description.

If it is desired to mount a door leaf (2) in a door frame with the aid of the pivot hinge (1) shown, the flange (26) of the pivot (3) will initially rest on the bottom (32) of the fastening base (7) under the influence of gravity. It is then for example possible to arrange a sheet of paper above the pivot (3) so that the latter will not already be driven out of the adjusting sleeve (10) in an undesirable way under the influence of the attractive force of the magnet (77) in the socket (5) when the door leaf (2) is being manipulated into the door frame. The door leaf (2) may initially be brought almost to the desired position, at which point this sheet of paper can be removed. The second end (24) of the pivot (3) will then be driven into this fitting sleeve (78) under the influence of the attractive force between the permanent magnets (22, 77) of the pivot (3) and the socket (5). In this case, the displacement of the pivot (3) in the height direction is limited since the first end (23) of the pivot (3) comprises a widened cylindrical portion (17), a collar (18) of which adjoins a cylindrical base body (16) of the pivot (3). The fitting sleeve (4) is in turn provided with an internal collar (30) in the insertion space (29), in which the pivot (3) is displaceable in terms of height, behind which internal collar (30) the collar (18) of the pivot (3) engages when the second end (24) of the pivot (3) is driven out of the fitting sleeve (4). Once the pivot (3) has been driven into this position, the pivot (3) may be fixed with respect to the fitting sleeve (4) with the aid of a fixing element (13). To this end, the pivot (3) is provided with a slot (19) in which this fixing element (13) can engage in the embodiments shown. To this end, the fixing element (13) comprises an annular engagement edge (69) to engage in this slot (19). This annular engagement edge (69) is provided with an access opening (70) through which the pivot (3) can be fitted for this purpose. Alternatives for such a fixing element are also possible, such as for example the fixing element as described and shown in BE 1 020 498 A5.

Figure 6:
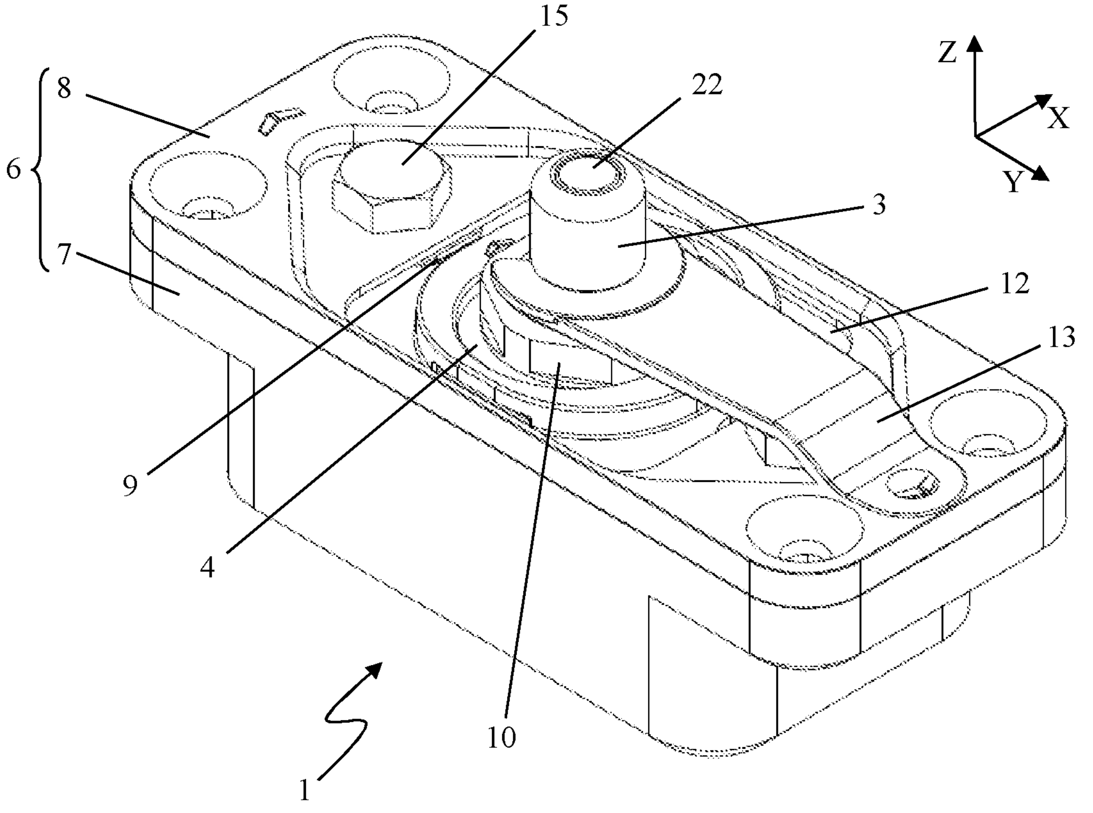
FIG. 6 shows a perspective view of an alternative embodiment of a pivot hinge according to at least one embodiment of the present disclosure, in which an alternative fixing element is provided compared to the embodiment from FIG. 1.
Figure 7:
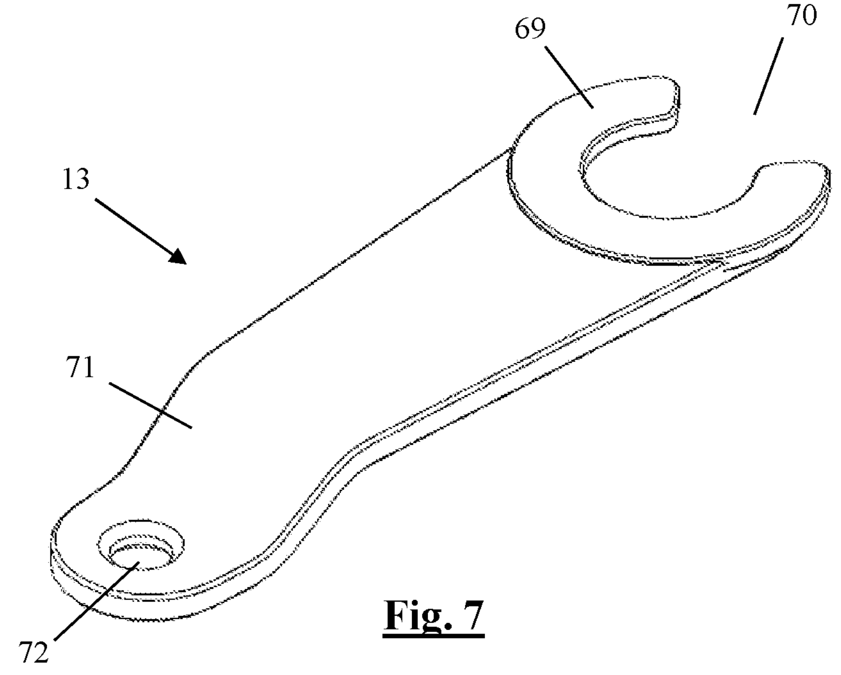
FIG. 7 shows a separate perspective view of the fixing element of the pivot hinge from FIG. 6.

In order to detach a door leaf (2) that has been hung in a door frame using the pivot hinge (1) shown, the fixing element (13) may initially be removed again. To this end, this fixing element (13) is provided with an engagement lip (71) which is provided with an opening (72) through which a hand tool is able to engage therewith in order to detach the fixing element (13). In the second embodiment shown, this engagement lip (71) is designed to be longer than the engagement lip (71) from the first embodiment shown for ease of use, and is in the form of a handle (see FIGS. 6 and 7). Once the fixing element (13) has been removed, a hand tool can be used to engage with the adjusting sleeve (10) and turn it in order to screw the fitting sleeve (4) downwards. This takes the pivot (3) downwards, counter to the magnetic force of the magnets (22, 77) of the pivot (3) and the socket (5), in which case the second end of the pivot (3) is removed from the socket (5). In this way, the door leaf (2) is detached from the door frame.

The invention claimed is:

1. A recessed pivot hinge for hingeably fastening a door leaf in a door frame, comprising:

a pivot having a first end and a second end;

a fitting sleeve in which at least the first end of the pivot is fitted in a height-adjustable manner, wherein this fitting sleeve is fastenable in a manner to prevent rotation in the door leaf in order to fasten the pivot in the door leaf;

a socket which is fastenable in a recessed manner in the door frame or forms part thereof;

wherein the pivot is provided with one or more magnetic elements, and the socket is provided with one or more magnetic elements, in order to draw the second end of the pivot into the socket using the magnetic elements of the pivot and the socket;

wherein the pivot hinge includes a fastening body, to be recessed into the door leaf, for fastening the fitting sleeve in the door leaf, and the fitting sleeve is fastened in the fastening body so as to be adjustably displaceable in a first direction (X) transverse to the height direction (Z) and is fastened in the fastening body so as to be adjustably displaceable in a second direction (Y) transverse to the first direction (X) and transverse to the height direction (Z); and wherein the pivot hinge is provided with respective first and second actuators including respective first and second actuating heads which are provided for a hand tool to engage therewith for the adjustable displacement of the fitting sleeve in the fastening body in the first direction (X).

2. The pivot hinge according to claim 1, wherein the pivot hinge comprises a pivot holder which is mounted in the fastening body in an adjustably displaceable manner, and the fitting sleeve is mounted in this pivot holder in an adjustably displaceable manner in order to mount this fitting sleeve in the fastening body so as to be adjustably displaceable in the first direction and in the second direction (Y).

3. The pivot hinge according to claim 2, wherein the pivot holder is mounted in the fastening body so as to be adjustably displaceable in the first direction (X), and the fitting sleeve is mounted in the pivot holder so as to be adjustably displaceable in the second direction (Y).

4. The pivot hinge according to claim 3, wherein the pivot hinge is provided with actuators comprising a plurality of actuating heads which are provided for a hand tool to engage therewith for the adjustable displacement of the fitting sleeve in the fastening body, wherein the actuators comprise fasteners which are displaceable in corresponding slots for the adjustable displacement of the fitting sleeve in the fastening body, wherein the actuators are implemented as bolts and nuts, wherein these nuts and/or these bolts are designed as guide blocks, which are fitted with guiding action in a corresponding fitting space, for guiding the displacement movement of the fitting sleeve with respect to the fastening body, and wherein the actuators comprise an adjusting sleeve which is provided with an internal screw thread and which serves as an aforementioned actuating head and an aforementioned nut, the fitting sleeve is provided with a corresponding external screw thread and serves as an aforementioned bolt and an aforementioned guide block and to this end is fitted in an aforementioned fitting space, and the pivot holder is provided with an aforementioned fitting slot through which the fitting sleeve is fastened to the adjusting sleeve by the internal screw thread and the external screw thread engaging with each other, such that the fitting sleeve and the adjusting sleeve are adjustably displaceable with respect to the fitting slot in the pivot holder.

5. The pivot hinge according to claim 4, wherein the fitting space in the pivot holder is provided with an internal collar with which the fitting sleeve engages when the fitting sleeve is being fastened in the pivot holder with the aid of the adjusting sleeve.

6. The pivot hinge according to claim 3, wherein the pivot hinge is provided with actuators comprising a plurality of actuating heads which are provided for a hand tool to engage therewith for the adjustable displacement of the fitting sleeve in the fastening body, wherein the actuators comprise fasteners which are displaceable in corresponding slots for the adjustable displacement of the fitting sleeve in the fastening body, and wherein one or more surfaces of the fastening body and/or the pivot holder, which are clamped against one another with the aid of the fasteners when the pivot holder is being fastened in the fastening body, are provided with a structural relief.

7. The pivot hinge according to claim 6, wherein the actuators include an adjusting sleeve which is provided with an internal screw thread and which serves as an aforementioned actuating head and an aforementioned nut, the fitting sleeve is provided with a corresponding external screw thread and serves as an aforementioned bolt and an aforementioned guide block and to this end is fitted in an aforementioned fitting space, and the pivot holder is provided with an aforementioned fitting slot through which the fitting sleeve is fastened to the adjusting sleeve by the internal screw thread and the external screw thread engaging with each other, such that the fitting sleeve and the adjusting sleeve are adjustably displaceable with respect to the fitting slot in the pivot holder.

8. The pivot hinge according to claim 2, wherein the pivot hinge is provided with actuators comprising a plurality of actuating heads which are provided for a hand tool to engage therewith for the adjustable displacement of the fitting sleeve in the fastening body, wherein the actuators comprise fasteners which are displaceable in corresponding slots for the adjustable displacement of the fitting sleeve in the fastening body, and wherein one or more surfaces of the fastening body and/or the pivot holder, which are clamped against one another with the aid of the fasteners when the pivot holder is being fastened in the fastening body, are provided with a structural relief.

9. The pivot hinge according to claim 1, wherein the fastening body includes an upper surface, and the respective first and second actuators include first actuators which are configured to displace the fitting sleeve in the first direction (X) and which include at least one first actuating head of the aforementioned actuating heads, wherein this first actuating head protrudes at least partially beyond the upper surface so that the hand tool can engage therewith, and wherein this actuating head includes an upper surface which also forms an upper surface of the first actuators and always remains positioned at the same height above the upper surface of the fastening body.

10. The pivot hinge according to claim 9, wherein the first and second actuators include second actuators which are configured to displace the fitting sleeve in the second direction and which include a second actuating head of the aforementioned actuating heads, wherein this second actuating head protrudes at least partially beyond the upper surface so that the hand tool can engage therewith, and wherein this actuating head comprises an upper surface which also forms an upper surface of the second actuator and always remains positioned at the same height above the upper surface of the fastening body.

11. The pivot hinge according to claim 9, wherein the top of the fastening body is provided with one or more depressions, which are recessed with respect to the upper surface, and the actuating heads are arranged partially in these one or more depressions.

12. The pivot hinge according to claim 1, wherein the respective first and second actuators include first and second fasteners which are displaceable in corresponding slots for the adjustable displacement of the fitting sleeve in the fastening body.

13. The pivot hinge according to claim 12, wherein the first and second fasteners are implemented as bolts and nuts, wherein these nuts and bolts are designed as guide blocks, which are fitted with guiding action in a corresponding fitting space, for guiding the displacement movement of the fitting sleeve with respect to the fastening body.

14. The pivot hinge according to claim 1, wherein the fastening body includes a first longitudinal side, which is configured to be arranged on a first side of the door leaf, and a second longitudinal side, which is configured to be arranged on a second side of the door leaf, and the actuators are arranged centrally between the two longitudinal sides.

15. The pivot hinge according to claim 1, wherein the pivot is provided with a permanent magnet as the aforementioned magnetic element and the socket is provided with a permanent magnet as the aforementioned magnetic element.

* * * * *